C. BIRAULT.
SIGHTING INSTRUMENT FOR AVIATION PURPOSES.
APPLICATION FILED JUNE 29, 1917.

1,298,648.

Patented Apr. 1, 1919.
2 SHEETS—SHEET 1.

Fig. 1ª

Inventor:
Camille Birault

C. BIRAULT.
SIGHTING INSTRUMENT FOR AVIATION PURPOSES.
APPLICATION FILED JUNE 29, 1917.
1,298,648.
Patented Apr. 1, 1919.
2 SHEETS—SHEET 2.
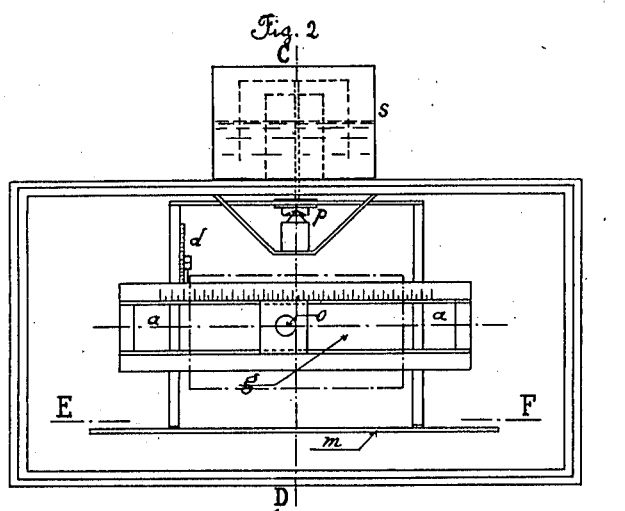
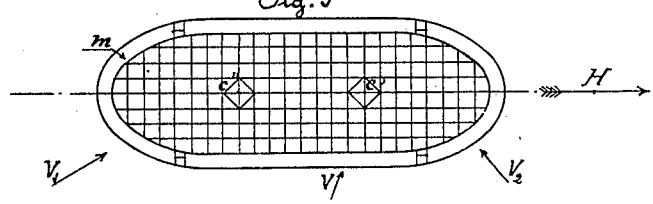

UNITED STATES PATENT OFFICE.

CAMILLE BIRAULT, OF PARIS, FRANCE.

SIGHTING INSTRUMENT FOR AVIATION PURPOSES.

1,298,648.  Specification of Letters Patent.  Patented Apr. 1, 1919.

Application filed June 29, 1917. Serial No. 177,797.

*To all whom it may concern:*

Be it known that I, CAMILLE BIRAULT, citizen of the French Republic, residing at Paris, 4 Rue Mariotte, have invented new and useful Improvements in Sighting Instruments for Aviation Purposes, of which the following is a specification.

The object of this apparatus is to provide an aviator with the necessary means enabling him to bombard with precision or to locate an enemy object.

One form of construction of the sighting instrument is represented in Figures 1, 2 and 3 of the accompanying drawing.

Fig. 1 is a sectional elevation taken along the line C—D of Fig. 2.

Fig. 1ª is a similar view showing a slight modification in the arrangement of the apparatus;

Fig. 2 is an elevation taken along the line A—B of Fig. 1, and

Fig. 3 is a sectional plan taken along the line E—F of Fig. 2.

The sighting instrument is constructed as follows:

$g$ is a mirror of changeable inclination, the average of which is at 45°. The horizontal axis $a$ of the mirror is arranged parallel to the direction of progress of the flying machine, that is to say parallel to the axis of the flying machine supposing the latter is not diverted by the wind.

Figure 1:
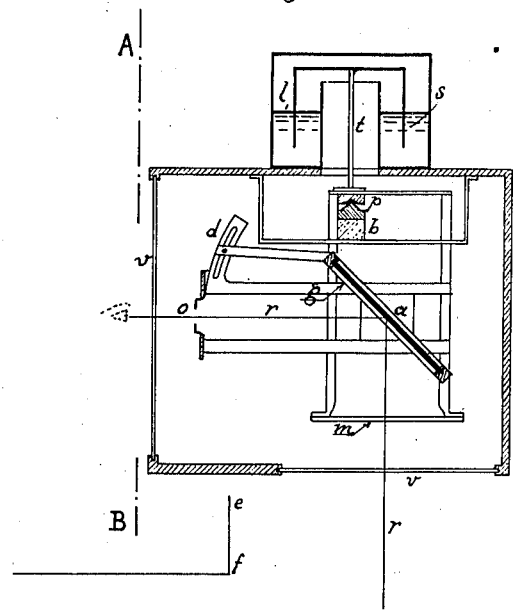
Figure 1:
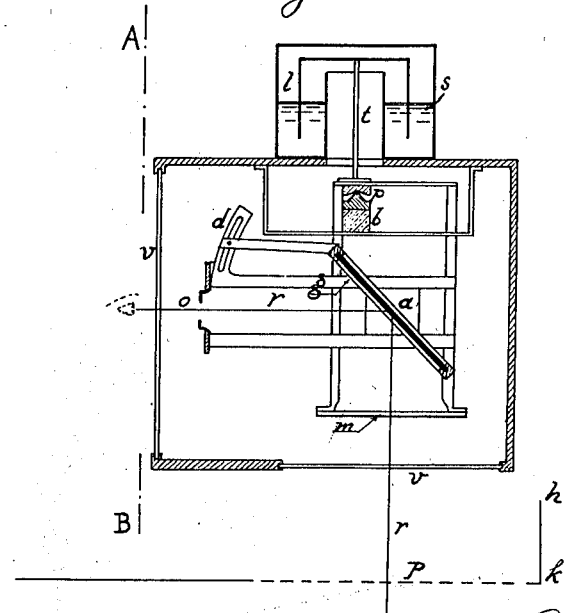

The sighting instrument is so disposed as either to overhang the side of the car which in this case is represented by $e\ f$, Fig. 1, or in the case of a car with a glazed platform P beneath the observer the side of the car is represented by $h\ k$, Fig. 1ª. The aviator views the image of the ground in the mirror which makes it appear vertical to him, if the mirror is at 45°, a vertical ray reflecting horizontally from the mirror.

Below the mirror $g$ is a netting $m$ consisting of a framed screen of silk threads. Accordingly the aviator sees a picture of the ground through a screen which is the image of the netting $m$ in the mirror $g$.

By such a sighting instrument the aviator can make observations without bending his head over the side of the car. This is one of the advantages of this sighting instrument.

Observations for bombardment purposes are made through an aperture in the sighting plate $o$ which with its index can be displaced horizontally between graduated slides. The line of sight traverses the center of the aperture of the sighting plate and the image of a screen, its position being determined by the netting $m$ and indicated by the intersection $c^1$, Fig. 3 for example for the direction H of advance indicated in this figure.

Horizontal displacements of the aperture in the sighting plate vary the direction of the line of sight in the plane of progress of the flying machine. Also variations of inclination of the mirror $g$ relative to its average position at 45° cause the direction of the line of sight to vary.

This line of sight can therefore be directed in any manner whatever in space, the orientation being determined by the position of the index of the aperture in the sighting plate $o$ relative to the graduation of the slide and by the position of the index of the connecting rod of the mirror with respect to the graduation of the sector $d$.

The position of the aperture of the sighting plate and the orientation of the mirror which are suitable for effecting bombardment under known conditions the aviator can find by reference to shooting-practice-tables, or by known methods of estimations, taking into account the altitude and speed of the flying machine. A simple method of determining the speed of the flying machine relative to the ground is available by the use of the sighting instrument if one times the interval between the two successive passages of the same point of the ground to the right of the two lines of sights determined by the sighting-plate-aperture and the images of the two intersections $c^1\ c^{11}$ of the netting $m$, Fig. 3.

The combination of mirror, netting $m$ and sighting plate is supported on an apex $p$ like a pendulum.

The support $p$ is carried on an elastic block $b$ in order to avoid the effect of the vertical vibrations of the car. Moreover the horizontal oscillations are tranquilized by a stabilizer containing a viscous liquid $s$. This stabilizer is an annular vessel in which is immersed a cylinder $l$ secured to a disk which is connected to the pendulum by a rod $t$. A protective case provided with glass panes $v\ v$ shelters the pendulum from the wind.

Thus is obtained in a practical and very satisfactory manner the invariability of the orientation of the line of sight V whatever be the movements of the aircraft.

If the aircraft is diverted by the wind the pendulum can be set parallel to the direction of advance which then makes a certain angle with the axis of the aircraft. This orientation of the sighting instrument can be produced either by making the pendulum turn in its protective case, or by making the protective case itself turn, the relative orientation of the pendulum being at that time invariable.

By reference to Fig. 3 is will be seen that the direction of the aircraft can be well controlled before flying over the object, by an observation V1 made in the plane of the sighting-plate-aperture and on the left of the index, as indicated in Fig. 3.

The control of the direction for aiming at objects at a great distance can be facilitated by a thread lateral to the mirror, arranged in the plane of the sight and commanded by the inclination of the mirror.

The ground can be seen well in front of the aircraft and controls it if the object appears on the forward extremity of the image of the central thread of the netting $m$, allowing the forward advance of the aircraft to be sufficiently corrected in order to conveniently sight the object at the moment of bombardment.

The same arrangement applies to the observation V2 in front of the sighting-plate aperture allowing of the observation of the ground behind the flying machine after bombardment and to note by the divisions of the netting $m$ the relative distances both longitudinal and transverse of the object and point of impact, and also facilitates an immediate regulation of the orientation to be given to the line of sight in order to continue the bombardment with precision.

Moreover, according to the height of flight of the aircraft, the squares of the netting $m$ correspond to known distances on the ground whereby rapid marking of an enemy object on a map can be made according to the distances estimated by the netting $m$ from the points on the ground, the position of which on the chart is known. An analogous simplified apparatus can be used by the pilot in order that he can indicate his direction of flight relative to the object over which he is flying.

The advantages due to the use of this new sighting instrument can be summed up as follows:—

(a) The object appears very near the sighting instrument and the contrivance allows of constant control of the direction to be given to the aircraft in order to conveniently fly over the object to be bombarded even if the aircraft is diverted by the wind.

(b) The instant when the projectiles should be thrown from the aircraft is determined with precision by the object passing a line of sight the orientation of which remains practically invariable in space, whatever be the movements of the aircraft.

(c) The orientation of the line of sight being determined by known method, the sighting instrument permits of immediate regulation and precision by observation of the points of impact.

(d) The apparatus can be utilized for the rapid marking of enemy objects.

(e) The employment of the sighting instrument for all these operations does not require the aviator to lean over the side of the car.

For a direct view if desired, the sighting instrument can be replaced by a small telescope or an optical magnifying contrivance in order to carry out bombardments or undertake the mapping of objects at a great height.

I claim as my invention:

1. In combination with aircraft a sighting instrument constituting a pendulum and comprising a mirror adapted to assume various inclined positions, a netting below said mirror, a movable sighting plate in front of said mirror, graduated slides in coöperation with said sighting plate, a graduated sector, a connecting rod between said sector and said mirror provided with an index, and an elastic support for the sighting instrument.

2. In combination with aircraft a sighting instrument constituting a pendulum and comprising a mirror adapted to assume various inclined positions, a netting below said mirror, a movable sighting plate in front of said mirror, graduated slides in coöperation with said sighting plate, a graduated sector, a connecting rod between said sector and said mirror provided with an index, an elastic support for the sighting instrument, and a stabilizer comprising a vessel containing a viscous liquid, and an inverted cylinder dipping into said liquid and a rod connecting said cylinder and the sighting instrument.

In testimony whereof I have signed my name to this specification in the presence of two subscribing witnesses.

CAMILLE BIRAULT.

Witnesses:
 HENRI MONIN,
 CHAS. P. PRESSLY.